May 17, 1960
R. ESCHE
2,937,329
HIGH FREQUENCY GENERATOR
Filed Aug. 23, 1955
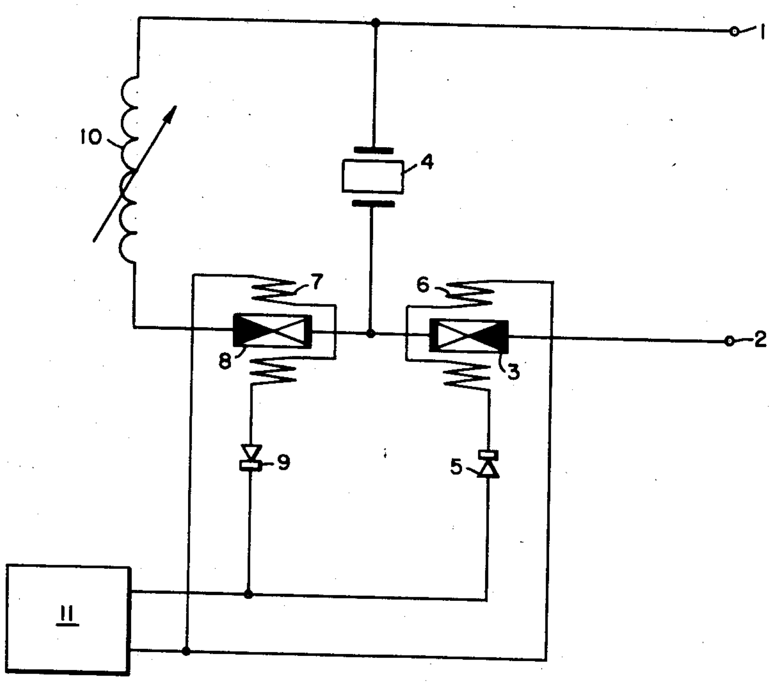
WITNESSES
Edwin E. Bassler
T. H. Murray
INVENTOR
Rolf Esche
BY F. E. Browder
ATTORNEY United States Patent Office 2,937,329

Patented May 17, 1960

2,937,329

HIGH FREQUENCY GENERATOR

Rolf Esche, Erlangen, Germany, assignor to Siemens-Schuckertwerke Aktiengesellschaft, Erlangen, Germany, a corporation of Germany Application August 23, 1955, Serial No. 530,134

Claims priority, application Germany September 23, 1954

6 Claims. (Cl. 321—45)

This invention relates to oscillators and more particularly to circuits for converting a direct current input to an oscillatory output.

It is an object of this invention to provide an improved oscillator or high frequency generator. As will become apparent from the following detailed description, the generator of the invention comprises an oscillatory tank circuit, a source of direct current, and a pair of control elements which serve to alternately charge the capacitance element of the tank circuit from the direct current source and discharge the same through the inductance element of the tank circuit. The invention is characterized in that magnetically controlled semiconductors are used as the above-mentioned control elements. These semiconductors are of high carrier mobility. That is, they are semiconductors of the "$A_3$ $B_5$" type having a magnetic barrier layer controllable by a magnetic field energizing winding.

Semiconductors of the $A_3$ $B_5$ type consist of a compound of an element in the third group of the periodic table of elements and an element in the fifth group. InSb is an example of this type of compound. These compounds, of high carrier mobility in the range of 6,000 cm.$^2$/volt second or higher, are characterized by a resistance effect which can be varied over a wide range by a magnetic field which is applied normal to the direction of current flow through the semiconductor. If the magnitude of the applied magnetic field becomes sufficiently great, current flow through the semiconductor will be substantially fully impeded. Thus, by applying a magnetic field to the semiconductor in this manner, it can be made to behave as a switch.

Further objects and features of the invention will become apparent from the following detailed description taken in connection with the accompanying single figure drawing which illustrates the invention in schematic form.

Referring to the drawing, a barium titanate condenser 4 is charged by a source of direct current voltage, not shown, applied to input terminals 1 and 2. Included in the charging circuit is a semiconductor 3 of the $A_3$ $B_5$ type, described above. The barium titanate condenser 4 is described in the May 1949 issue of Tele-Tech. It comprises one type of electromechanical converter or piezo electric crystal, the properties of which are well known to those skilled in the art. In shunt with condenser 4 is a second semiconductor 8 of the $A_3$ $B_5$ type and an inductance 10.

A first magnetic field-producing winding 6 is disposed with respect to semiconductor 3 to produce a magnetic field normal to the direction of current flow therethrough. A second magnetic field-producing winding 7 is disposed in a similar manner with respect to semiconductor 8. A source of oscillations 11 is applied to windings 6 and 7 through rectifiers 5 and 9. The two rectifiers are connected to conduct opposite polarities so that during one half cycle of the applied oscillations from source 11, a magnetic field will be produced by winding 6, while on the other half cycle a magnetic field will be produced by winding 7.

If it is assumed, initially, that rectifier 9 is conducting the magnetic field produced by winding 7 will block current flow through semiconductor 8. However, since the output of source 11 is blocked by rectifier 5 during this time, there will be an absence of a magnetic field from winding 6, and the resistance of the semiconductor 3 will be approximately zero. Thus, the condenser 4 will be charged by the source of direct current applied to terminals 1 and 2 during this half cycle. On the next half cycle the above process is reversed. Winding 6 now produces a magnetic field to block current flow through semiconductor 3 while semiconductor 8 is substantially resistance-free. Consequently, the condenser 4 can now be discharged over the inductance 10 to energize the oscillating circuit comprising condenser 4 and inductance 10. This process repeats itself at the frequency of the oscillations supplied from source 11.

Semiconductors with magnetic barrier layers can be used instead of the semiconductors 3 and 8 of high carrier mobility. In this case the circuit connections of the magnetic field-energizing windings 6 and 7 and of the rectifiers 5 and 9 are the same as those described for the semiconductors of high carrier mobility. It is necessary in either case to see that the blocking direction of the semiconductors is provided in the correct manner (i.e., that the blocking in the charging circuit is opposite to the direction of the direct current supplied to terminals 1 and 2, and that the blocking in the discharge circuit is opposite to the first current impulse from condenser 4).

As an alternative to the barium titanate condenser 4 used in the embodiment of the invention shown, a conventional condenser may be used. Likewise, a magnetostricting oscillator may be used in place of inductance 10. A further modification of the invention could involve means for generating damped oscillations in the oscillating circuit of condenser 4 and inductance 10 together with means for coupling the oscillation energy to a second oscillating circuit. The last-mentioned modification is particularly advantageous in that the duration of the oscillations can be extended longer since the secondary oscillating circuit continues to oscillate in damped form even with increased resistance values of the semiconductor 8.

Although the invention has been described in connection with a certain specific embodiment, it will be apparent to those skilled in the art that various changes in form and arrangement of parts can be made to suit requirements without departing from the spirit and scope of the invention.

I claim as my invention:

1. A high frequency generator for converting a source of direct current input voltage to an oscillatory output comprising a pair of input terminals adapted for connection to said voltage source, a first semiconductor device and a capacitive element in series connecting said terminals, a second semiconductor device and an inductive element in series, said second semiconductor device and inductive element being connected in shunt with said capacitive element, first winding means adapted to produce a magnetic field normal to the direction of current flow through said first semiconductor device, second winding means adapted to produce a magnetic field normal to the direction of current flow through said second semiconductor device, and means for alternately energizing said first and second winding means.

2. A high frequency generator for converting a source of direct current input voltage to an oscillatory output comprising a pair of input terminals adapted for connection to said voltage source, a first semiconductive device and a capacitive element in series connecting said terminals, the series combination of a second semiconductive device and an inductance element connected in shunt with said capacitive element, said first and second semiconductive devices having a carrier mobility above 6,000 cm.²/volt second, and means for applying a magnetic field across said semiconductors alternately and normal to the direction of current flow therethrough.

3. In a high frequency generator for converting a source of direct current input voltage to an oscillatory output, a tank circuit having a capacitive element and an inductive element, means for controlling charging of said capacitive element including a semiconductive device of high carrier mobility and a magnetic field applied normal to the direction of current flow through said device, and means for controlling discharge of said capacitive element through said tank circuit and including a second semiconductive device of high carrier mobility and a magnetic field applied normal to the direction of current flow through said second device, the magnetic field applied normal to the direction of current flow through said device and the magnetic field applied normal to the direction of current flow through said second device being applied alternately to thereby alternately charge and discharge said capacitive element.

4. In a high frequency generator for converting a source of direct current input voltage to an oscillatory output, a tank circuit having a capacitive element and an inductive element, a first semiconductive device for controlling charging of said capacitive element, a second semiconductive device for controlling discharge of said capacitive element through said tank circuit, and means including a magnetic field applied across each of said semiconductive devices for alternately varying current flow therethrough.

5. In a high frequency generator for converting a source of direct current input voltage to an oscillatory output, a tank circuit having an inductance element and a capacitive element, an element whose resistance varies as a function of a magnetic field applied thereto for controlling charging of said capacitive element, a second element whose resistance varies as a function of a magnetic field applied thereto for controlling discharge of said capacitive element through said tank circuit, and means operatively associated with said element and said second element for alternately applying magnetic fields to the element and the second element to thereby alternately vary the resistance values thereof.

6. In a high frequency generator for converting a source of direct current input voltage to an oscillatory output, a tank circuit having a capacitive element and an inductive element, a semiconductive device of the $A_3$ $B_5$ type for controlling charging of said capacitive element, and a second semiconductive device of the $A_3$ $B_5$ type for controlling discharge of said capacitive element through said tank circuit, said semiconductive device and said second semiconductive device being adapted to be alternately operative to alternately charge and discharge said capacitive element.

References Cited in the file of this patent

UNITED STATES PATENTS

| | | |
|---|---|---|
| 2,146,977 | Nilsson | Feb. 14, 1939 |
| 2,553,490 | Wallace | May 15, 1951 |
| 2,641,717 | Toth | June 9, 1953 |
| 2,659,043 | Taylor | Nov. 10, 1953 |
| 2,707,752 | Gabler | May 3, 1955 |